Dec. 25, 1934.  G. SYKES  1,985,670
RIPE FRUIT CORRUGATED PACKING TRAY
Filed June 16, 1934
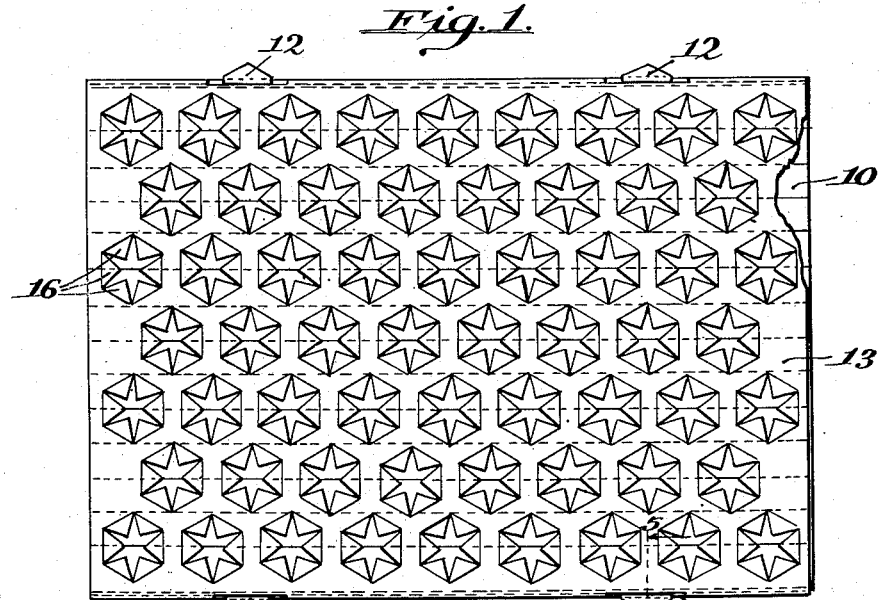
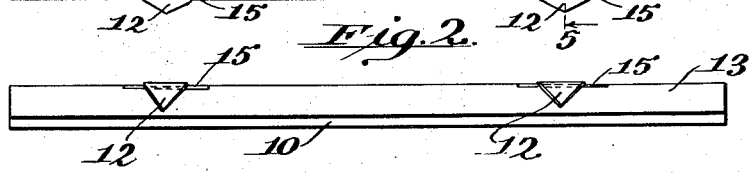
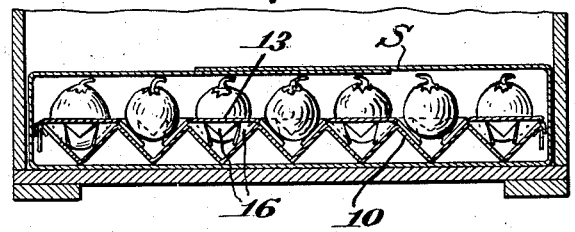
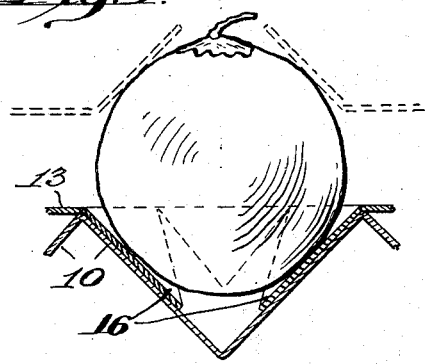
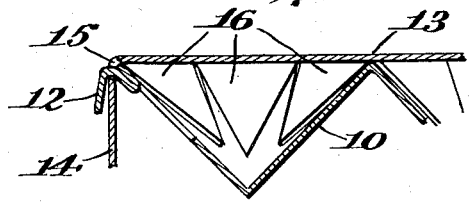
Inventor
GEORGE SYKES.
By Martin P. Smith,
Attorney.

Patented Dec. 25, 1934

1,985,670

UNITED STATES PATENT OFFICE 1,985,670

RIPE FRUIT CORRUGATED PACKING TRAY

George Sykes, Los Angeles, Calif.

Application June 16, 1934, Serial No. 730,954

11 Claims. (Cl. 217—26)

My invention relates to a tray that is especially designed for the packaging and shipping of ripe fruit and has for its principal objects to generally improve upon and simplify the construction of the existing forms of packing trays and to provide a corrugated tray of relatively simple and inexpensive construction that may be advantageously employed for the shipment of ripe fruit and the like with minimum loss of the packed and shipped fruit as a result of rubbing or jolting contact between the individual members of the packed and shipped product.

A further object of my invention is, to provide a packing tray composed of only two parts, the base or supporting member comprising a section of corrugated paper or light weight cardboard and the upper member being composed of paper or light weight cardboard having a plurality of pockets for the reception of the individual fruits, said pockets each having a plurality of flexible fruit supporting members that extend downward into the corrugations of the lower or base member when the fruit is placed in the pockets.

My improved packing tray is especially desirable for use in the shipment of ripe fruit or fruit that is comparatively soft when ripe and the arrangement and construction of the fruit receiving pockets in the tray is such as to reduce to a minimum the possibility of rubbing or jolting contact between the individual fruits packed in the tray.

With the foregoing and other objects in view my invention consists in certain novel features of construction and arrangements of parts that will be hereinafter more fully described and claimed and illustrated in the accompanying drawing in which:

Fig. 1 is a top plan view of a ripe fruit corrugated packing tray constructed in accordance with my invention.

Fig. 2 is a side elevational view of the tray.

Fig. 3 is a cross section of one of the trays packed with fruit and located within a shipping box or container.

Fig. 4 is an enlarged detail section of a portion of the tray and showing a fruit positioned in the pocket therein.

Fig. 5 is an enlarged cross section taken approximately on the line 5—5 of Fig. 1.

Referring by numerals to the accompanying drawing which illustrates a preferred embodiment of my invention, 10 designates the lower or base member of the tray which is formed from a single piece of heavy paper or cardboard of suitable weight, and this member is bent on longitudinal lines so as to form a series of substantially V-shaped corrugations of uniform width.

At the sides of this corrugated base member two or more substantially triangular downwardly projecting tongues 12 are cut from the material forming said base member.

The upper member 13 of the tray is composed of a sheet of paper or cardboard of suitable weight and the size of this upper member is such as to entirely cover the corrugated base 10 when the latter is bent into shape to receive the upper member.

Portions of the sides of member 13 are bent downward to form depending side flaps 14 and formed in the upper portions of said flaps just below the line where they unite with the body of the upper member, are suitably spaced longitudinally disposed slots 15 which receive the triangular tongues 12 when the two parts of the tray are assembled for use. (See Fig. 5).

In assembling the two parts of the tray the upper member 13 is positioned on top of lower or base member 10 and the tongues 12 are now bent outwardly and upwardly and then inserted through the corresponding slots 15, thereby holding the two parts of the tray in proper assembled relation.

The upper member 13 of the tray is cut and pressed so as to form a plurality of fruit receiving pockets, said pockets being preferably formed in longitudinally disposed rows so as to occupy positions directly above the V-shaped channels in the corrugated base 10 and with the members of each row in staggered or offset relation with respect to the members of the adjacent rows.

Such arrangement of the pockets utilizes to the best advantage the material from which the upper members of the tray are formed or in other words by staggering the pockets of one row relative to the adjacent rows a greater number of pockets may be formed in a sheet of given size than if the pockets were arranged in rows at right angles to each other.

The staggered arrangement of the pockets is such that the centers of any three pockets correspond with the points of an equilateral triangle.

Each pocket is formed by cutting three slits through the top sheet, which slits intersect each other and are disposed sixty degrees apart, and thus when the material between the slits is pressed downward, a series of six substantially triangular sections 16 are formed that project downwardly into the channels of the corrugated base when the fruit is placed in the pockets.

These triangular sections or tabs combine to form a substantially funnel-shaped pocket for the support of the inserted fruit and if the weight of the inserted fruit is sufficient, the tabs will be pressed downward against the upper surfaces of the grooves or channels in the corrugated base 10.

When the tabs 16 are pressed downward relative to the flat body 13 of the upper member, each pocket assumes a hexagonal shape due to the arrangement of the lines on which the tabs bend when moved downward and as the member 13 is formed of paper or cardboard having a certain degree of resiliency, the downwardly bent tabs provide a more or less elastic or flexible support for the fruit.

After the tray is packed with fruit, it is positioned wrapped with a sheet S of suitable paper or light weight cardboard as illustrated in Fig. 3 and inserted in a shipping box or container.

The individual fruits when packed in the pockets, are firmly held against lateral shifting movement while the shipping container is being handled and transported so that the fruit is effectually prevented from being injured or crushed as a result of rubbing or jolting contact between the individual fruits and thus the losses resulting from injury to the fruit during shipment are minimized.

In the packaging and shipping of certain fruits, it is possible to pack a plurality of the trays one on top of the other within a shipping case or container, but for the shipment of fruit that is very soft when ripe, it is advisable to pack but one tray in the shipping case.

Where two or more of the packing trays are packed in a shipping case, a greater measure of protection for the packed fruit may be provided by inverting one of the upper members 13 and the placing the same directly over the underlying layer of packed fruit as illustrated by dotted lines in Fig. 4, and as a further protection, one of the corrugated base members may be laid over the overlying inverted member 13.

One of the principal objects of the tray, is to provide a simple, inexpensive structure that will hold each individual fruit rigid with a minimum degree of pressure at tangential points of contact to effectually prevent any undue pressure upon the fruit as a result of vibration during transportation and each layer or tier of packed fruit contains the maximum number of individual fruits that it is possible to place in the tier or layer.

The trays may be produced with different amounts of pockets corresponding to the size of the fruit to be packed and likewise correspond to the length and width of the shipping cases or containers and the pockets are disposed in substantially equilateral triangular arrangement as near as the dimensions of the individual fruits and the length and width of the containers correlate.

The lines on which the triangular members 16 fold downwardly from the body of the sheet 13 are preferably scored in order to facilitate bending and to produce the proper degree of resiliency.

A packing tray of my improved construction may be conveniently and economically employed for the packaging and shipment of practically all fruits and the like, but it will be found particularly advantageous in the shipment of fruits that are comparatively soft when ripe, for instance, figs, peaches, persimmons, apricots, plums, pears and the like.

Obviously a tray having fruit receiving pockets of a given size may be utilized for shipment of fruits which vary slightly in size or which are graded to different sizes.

Thus it will be seen that I have provided a ripe fruit corrugated packing tray that is relatively simple in construction, inexpensive of manufacture, provides a firm and substantial support for holding the fruit in spaced relation and which is very effective in performing the functions for which it is intended.

It will be understood that minor changes in the size, form and construction of the various parts of my improved ripe fruit corrugated packing tray may be made and substituted for those herein shown and described without departing from the spirit of my invention, the scope of which is set forth in the appended claims.

I claim as my invention:

1. A ripe fruit packing tray, comprising a base member of paper or cardboard bent to form a plurality of parallel corrugations, an upper member of flexible material detachably secured to the base member and a plurality of rows of pockets formed in said upper member, which rows are disposed above the respective channels in the lower corrugated member with the members of each row of pockets staggered with respect to the members of the adjacent rows so that the centers of any adjacent three of said pockets define a substantially equilateral triangle.

2. A ripe fruit packing tray, comprising a base member of paper or cardboard bent to form a plurality of parallel corrugations, an upper member of flexible material detachably secured to the base member and a plurality of rows of pockets formed in said upper member, which rows are disposed above the respective channels in the lower member with the centers of any adjacent three of the pockets coinciding with the points of a substantially equilateral triangle.

3. In a ripe fruit packing tray, a base member of paper or cardboard bent to provide a plurality of parallel corrugations, an upper member composed of a sheet of flexible material detachably connected to said base member, said upper member being provided with a plurality of sets of intersecting slits with the material between said slits being bent downward to form fruit receiving pockets and which pockets are arranged so that the centers of any three pockets define a substantially equilateral triangle.

4. In a ripe fruit packing tray, a base member of paper or cardboard bent to provide a plurality of parallel corrugations, an upper member composed of a sheet of flexible material detachably connected to said base member, said upper member being provided with a plurality of sets of intersecting slits, the material between said slits being bent downward to form fruit receiving pockets, which pockets are arranged in parallel rows with one row disposed above each channel in the corrugated base and the centers of any adjacent three of said pockets defining a substantially equilateral triangle.

5. In a ripe fruit packing tray, a base member of paper or cardboard bent to provide a plurality of parallel corrugations, an upper member composed of a sheet of flexible material detachably connected to said base member, said upper member being provided with a plurality of sets of intersecting slits, the material between said slits being bent downward to form fruit receiving pockets, which pockets are arranged in parallel rows with one row disposed above each channel in the corrugated base and with the members of each row staggered with relation to the pockets of the adjacent rows so that the centers of any three of said pockets define a substantially equilateral triangle.

6. In a ripe fruit packing tray, a base member of paper or cardboard bent to form a plurality of parallel corrugations, tongues on the sides of said base member, an upper member formed from a sheet of flexible material overlying said base member, depending flaps formed on the side edges of said upper member, which flaps are slotted for the reception of the tongues on the sides of the base member and a plurality of rows of pockets formed in said upper member and arranged so that the centers of any adjacent three of said pockets define a substantially equilateral triangle and which pockets are positioned above the channels in the corrugated base member.

7. In a ripe fruit packing tray, a base member of paper or cardboard bent to form a plurality of parallel corrugations, tongues on the sides of said base member, an upper member formed from a sheet of flexible material overlying said base member, depending flaps formed on the side edges of said upper member, which flaps are slotted for the reception of the tongues on the sides of the base member, a plurality of rows of pockets formed in said upper member, which pockets are positioned above the channels in the corrugated base member and with the members of each row of pockets staggered with relation to the pockets in the adjacent rows so that the centers of any adjacent three of said pockets define a substantially equilateral triangle.

8. In a packing and shipping tray, a sheet of flexible material provided with a plurality of sets of intersecting slits, the material between said slits being bent downward to provide a tapered pocket and said sets of intersecting slits being disposed so that the centers of any adjacent three sets of slits define a substantially equilateral triangle.

9. In a packing and shipping tray, a sheet of flexible material provided with a plurality of sets of intersecting slits, the material between said slits being bent downward to provide a tapered pocket, said pockets being arranged in three parallel rows with the pockets of one row staggered with relation to the pockets of the adjacent rows and the distance between said parallel rows being equal so that the centers of any adjacent three of said pockets define a substantially equilateral triangle.

10. In a packing and shipping tray, a sheet of flexible material provided with a plurality of sets of intersecting slits, the material between said slits being bent downward to provide a tapered pocket and said pockets being arranged in three parallel rows that are spaced equal distances apart so that the centers of any three pockets coincide with the points of a substantially equilateral triangle.

11. In a packing and shipping tray, a sheet of flexible material provided with a plurality of sets of three intersecting slits, the material between said slits being bent downward to provide a tapered pocket and all of which pockets are arranged in three parallel rows that are spaced equal distances apart so that the centers of any three pockets coincide with the points of a substantially equilateral triangle.

GEORGE SYKES.